March 24, 1942.  E. S. GOODRIDGE  2,277,223
ELECTRIC INDUCTION FURNACE
Filed April 26, 1941   2 Sheets-Sheet 1
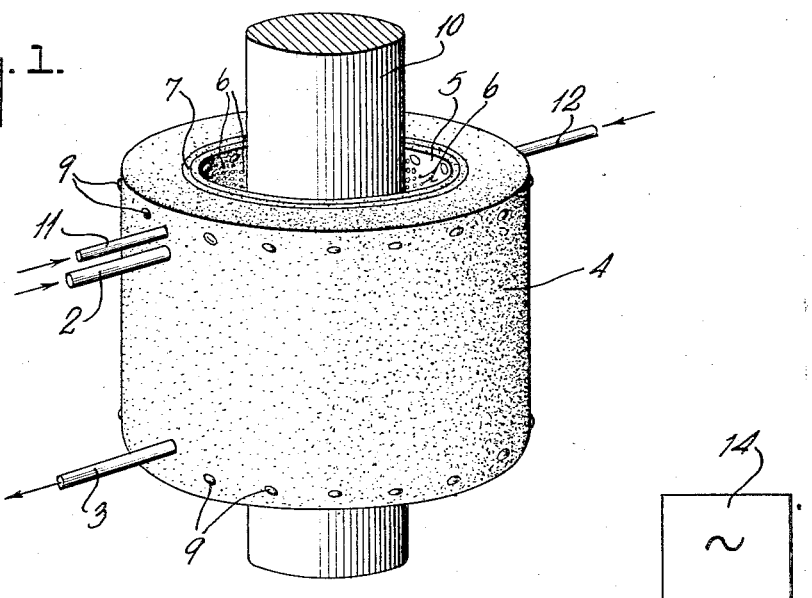
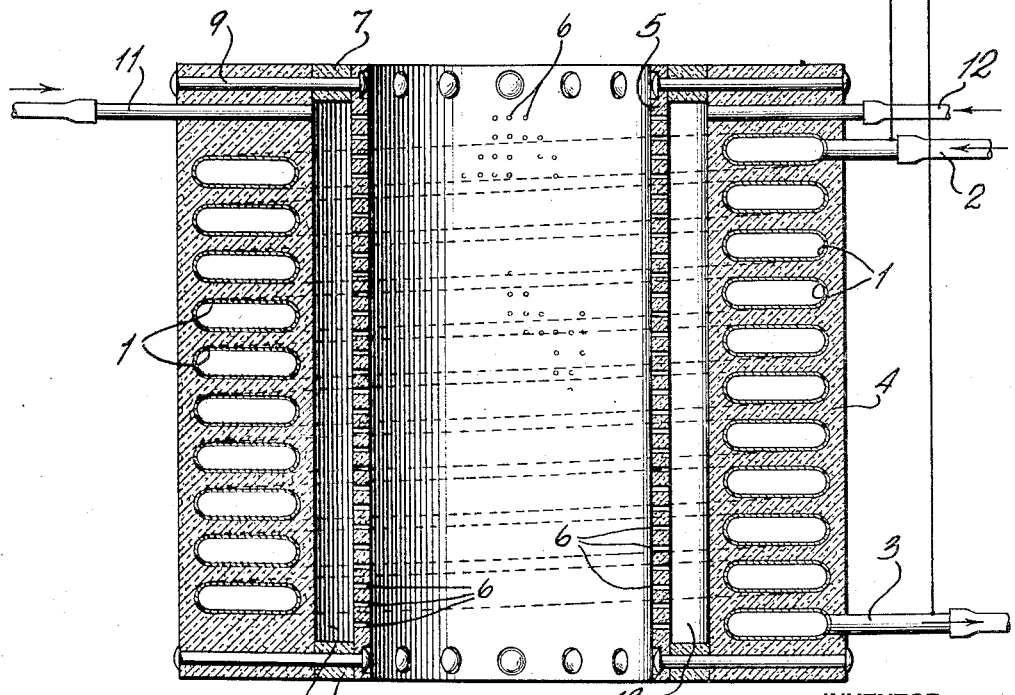
INVENTOR
EDWARD S. GOODRIDGE
BY
John J. Logan
ATTORNEY March 24, 1942. E. S. GOODRIDGE 2,277,223
ELECTRIC INDUCTION FURNACE
Filed April 26, 1941 2 Sheets-Sheet 2

INVENTOR
EDWARD S. GOODRIDGE
BY John J. Rogan
ATTORNEY

Patented Mar. 24, 1942

2,277,223

UNITED STATES PATENT OFFICE 2,277,223

ELECTRIC INDUCTION FURNACE

Edward S. Goodridge, Port Washington, N. Y., assignor to Induction Heating Corporation, New York, N. Y., a corporation of New York Application April 26, 1941, Serial No. 390,470

5 Claims. (Cl. 266—4)

This invention relates to heating devices and more particularly to heaters or furnaces of the high frequency induction type.

A principal object is to provide an improved electric induction furnace of the type which quenches the charge after or during heating.

A feature of the invention relates to a high frequency induction furnace having a novel arrangement of field coils and quenching distributor.

Another feature relates to a high frequency induction furnace having a perforated heat baffle between the heated charge and the field coil, which baffle also serves as a water distributor for uniformly subjecting the charge to quenching.

A further feature relates to a high frequency induction furnace employing a field coil of water-cooled hollow tubing which is embedded in a refractory or heat insulating material such as a non-conducting cement or ceramic, in conjunction with a water chest and distributor baffle located between the field coil and charge. As a result of this feature, the conductive field coil is heat-shielded from the charge by the baffle and by the surrounding ceramic, and there is negligible danger of the quenching medium causing a short circuit or attacking the metal of the field coil.

A further feature relates to a high frequency induction furnace which is surrounded either interiorly or exteriorly by an annular water chest having a perforated water distributing or discharge wall.

A still further feature relates to the novel organization, arrangement and relative location of parts which constitute an improved high frequency induction heating furnace of the quenching type.

Other features and advantages not specifically enumerated will be apparent after a consideration of the following detailed descriptions and the appended claims.

In the drawings which show certain preferred embodiments,

Fig. 1 is a perspective view of an induction furnace embodying features of the invention.

Fig. 2 is an enlarged sectional view of Fig. 1 taken on a transverse vertical plane, but with the charge omitted.

Figure 3:
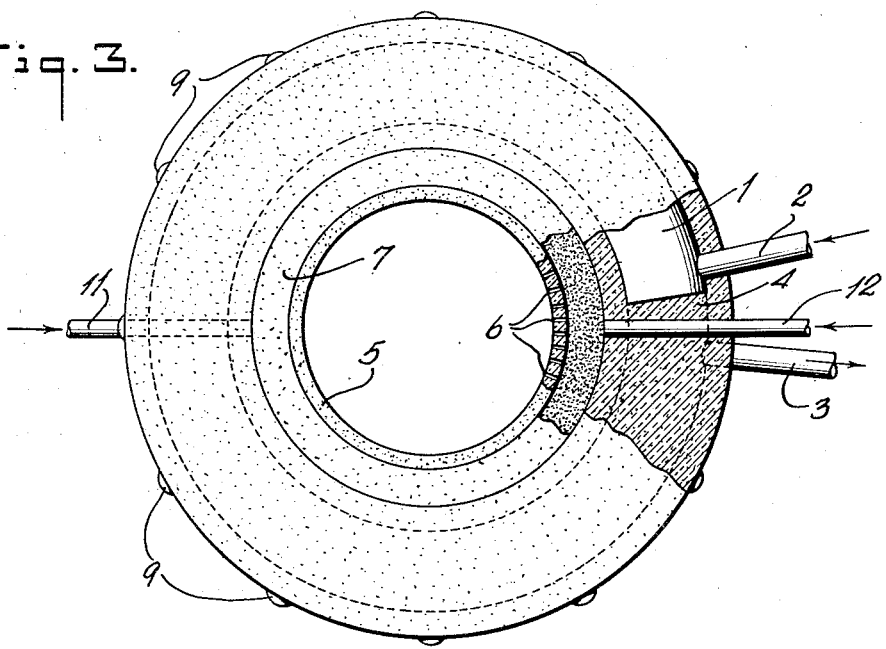
Fig. 3 is a top-plan view of the furnace of Figs. 1 and 2 with a portion of the top wall broken away to show the internal construction more clearly.

Referring to Figs. 1 to 3, the furnace employs a helically wound field coil 1 of flattened tubular metal stock such as copper, having a water inlet 2 and a water outlet 3, connected through suitable valves to a source of flowing water. The convolutions of the coil 1 are encased or embedded in a body 4 of heat and electric insulating material, for example cement or ceramic so as to form a rigid unitary annular body. Thus the convolutions of the field coil 1 are all protected both electrically, mechanically and against corrosion. Preferably, although not necessarily, the body 4 is cylindrical, although it may be formed to any other desired shape.

Mounted in spaced relation to the inner wall of body 4 is a cylindrical baffle 5 also of refractory electrical insulating material such as non-conductive cement or ceramic. Baffle 5 is provided throughout the major part of its area with perforated passages 6, and it is maintained in spaced relation to body 4 by upper and lower spacing rings 7 and 8 which likewise may be of refractory heat and electric insulating material similar to that of member 5. If desired, suitable gaskets or washers may be interposed between the spacing rings and members 4 and 5 to provide a liquid-tight joint. The entire assembly comprising members 4, 5, 7 and 8, is held together as a unit by a plurality of transverse rivets or bolts 9 which may be of non-conductive material if desired. It will be understood of course that the spacing rings 7 and 8 can be formed as an integral part of the body 4 or as an integral part of the baffle 5.

Baffle 5 therefore forms with body 4 an annular chamber or chest which interiorly surrounds the field coil and exteriorly surrounds the charge 10 which is to be heated. Consequently, the baffle supplements the body 4 in protecting the field coil 1 from the heat of the charge. At the same time it provides a chamber which can be filled with water or other desired quenching medium under pressure. For this latter purpose, a plurality of inlet pipes 11, 12, are sealed through the body 4 preferably, although not necessarily, adjacent the upper end of the furnace. The pipes 11, 12, are connected to a suitable quenching medium such as water or oil controlled by means of manual or automatically controlled valves whereby the quenching medium, at the appropriate interval during or after the heat treatment of charge 10, can flow into the annular chamber 13 from whence it will be distributed in a substantially uniform manner through the perforations 6 against the heated charge 10. It will be understood of course that the field coil 1 is connected to any suitable source 14 of high frequency alternating or pulsating current, such as ordinarily employed in electric induction furnaces.

Figure 4:
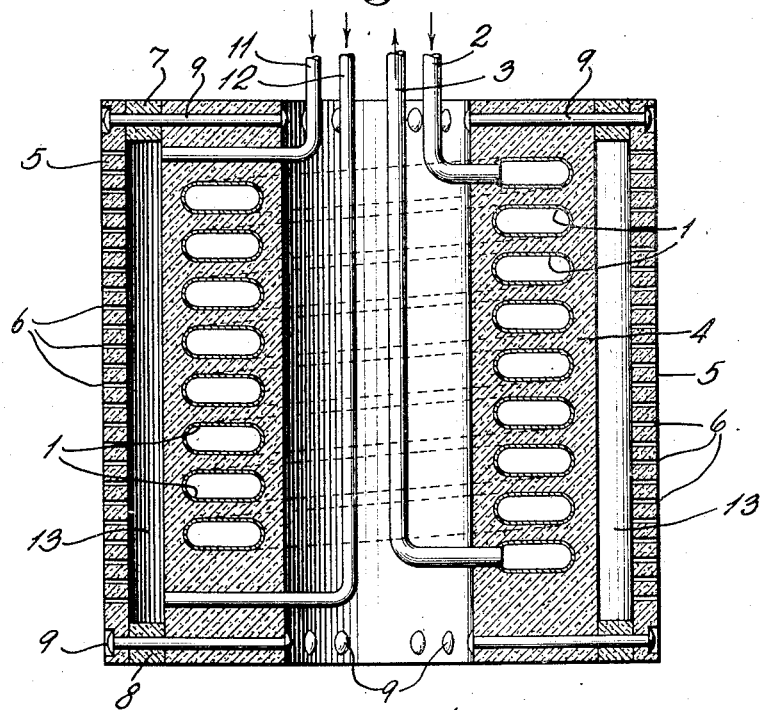
Fig. 4 is a modification of the furnace of Figs. 1 to 3.

While the furnace of Figs. 1 to 3 is adapted to heat charges by surrounding them, it will be understood that the invention can be applied to furnaces wherein the charge to be heated surrounds the furnace. Thus, in certain cases, it may be desirable to heat-treat hollow metal bodies such as pipes or the like. Accordingly, there is shown in Fig. 4 a modified furnace for this type of heating. In this modification, the furnace is of the same general construction as that shown in Fig. 2, and the parts which correspond to those of Fig. 2 bear the same designation numerals. The baffle 5 instead of surrounding the furnace on its interior annular wall surrounds it exteriorly so that the water chest 13 also surrounds the unitary field coil and ceramic body 1—4. In the embodiment of Fig. 4, the water inlet pipes for the field coil 1 and the inlet pipes for the quenching medium are brought out through the hollow interior of the furnace, the pipes 2 and 3 supplying the water to the field coil 1 while the pipes 11 and 12 supply the quenching medium to the chamber 13. Preferably the pipes 11 and 12 are sealed through the body 4 at opposite ends so as to provide a more uniform distribution of the water in the chamber 13.

By the term "ceramic" as employed in the attached claims, is meant any well-known heat and electric insulating material suitable for the purpose described including, without limiting thereto, cement, ceramic, porcelain and the like. By the term "charge" is meant any material which is required to be heated, annealed or otherwise treated whether in the form of a solid body, a hollow body or in the form of a molten mass contained in a suitable crucible or the like. While certain specific materials have been mentioned, it will be understood of course that variations may be made therein without departing from the spirit and scope of the invention. Thus while in the foregoing the baffle 5 is described in the form of an insulating material, it will be understood that it may be of suitable metal or conductive material providing it does not form a complete conductive loop. Thus the member 5 may be of a split cylinder with the spaced ends of the cylinder connected to a strip of insulation.

What I claim is:

1. An induction heater comprising a hollow convoluted field coil, a body of refractory insulating material enveloping said coil, a perforated insulating baffle mounted in spaced relation on said body to define a chamber to receive a quenching medium and also serving as a heat screen between the heated charge and said coil, and a connection for supplying said medium to said chamber.

2. An induction heater comprising a hollow convoluted field coil, a body of refractory insulating material in which said coil is embedded to form therewith a unitary tubular assembly, a tubular baffle plate attached to said assembly and forming therewith an annular chamber for a quenching liquid and also serving as a heat screen between the heated charge and said coil, said baffle having a series of perforations facing the charge to be heated.

3. An induction heater according to claim 2 in which said field coil is of hollow tubular conductive material connected to a cooling medium and separate connections are provided for supplying quenching medium to said annular chamber, whereby said field coil can be effectively insulated from the quenching medium.

4. An induction heater comprising a convoluted field coil embedded in ceramic to form a single tubular unit to receive a charge to be heated, a tubular perforated heat baffle joined to the inner wall of said unit and spaced therefrom at its ends in a liquid tight manner, and separate water supply connections to the convoluted field coil and to the space between said baffle and the inner wall of said unit.

5. An induction heater comprising a convoluted field coil embedded in ceramic to form a single tubular unit to receive a charge to be heated, a tubular perforated heat baffle joined to the outer wall of said unit and spaced therefrom at the ends in a liquid tight manner.

EDWARD S. GOODRIDGE.